INVENTOR.
GEORGE WILLIAM ZIEGLER JR.
BY

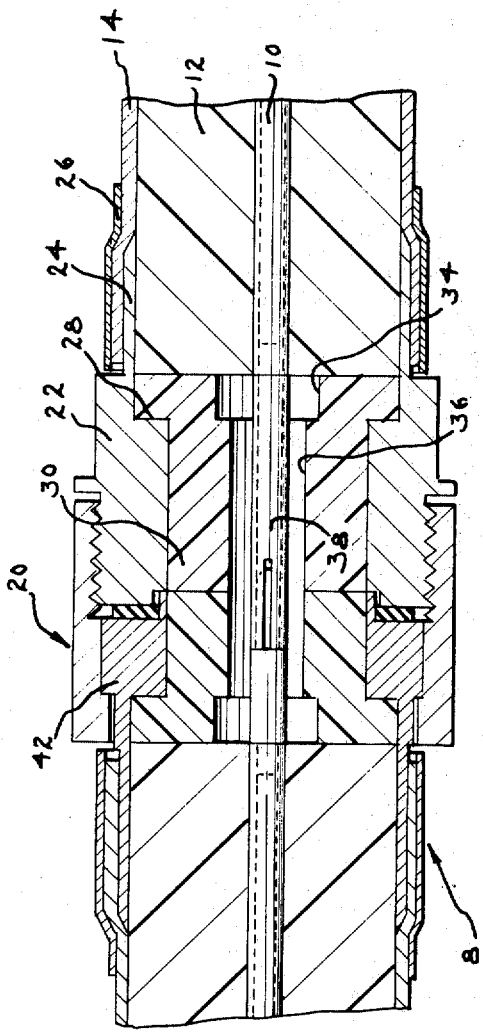
Fig. 4A
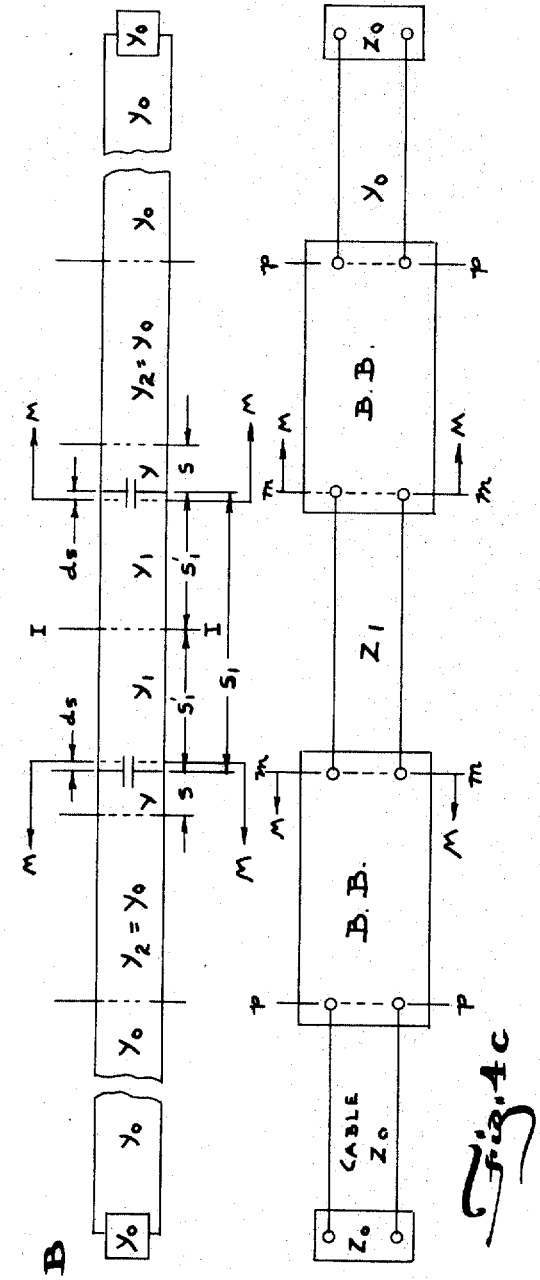
Fig. 4B
Fig. 4C
INVENTOR.
GEORGE WILLIAM ZIEGLER, JR.

Jan. 27, 1970   G. W. ZIEGLER, JR   3,492,605
HIGH FREQUENCY TRANSMISSION DEVICES AND METHODS OF COMPENSATION
Filed Oct. 14, 1964   6 Sheets-Sheet 3
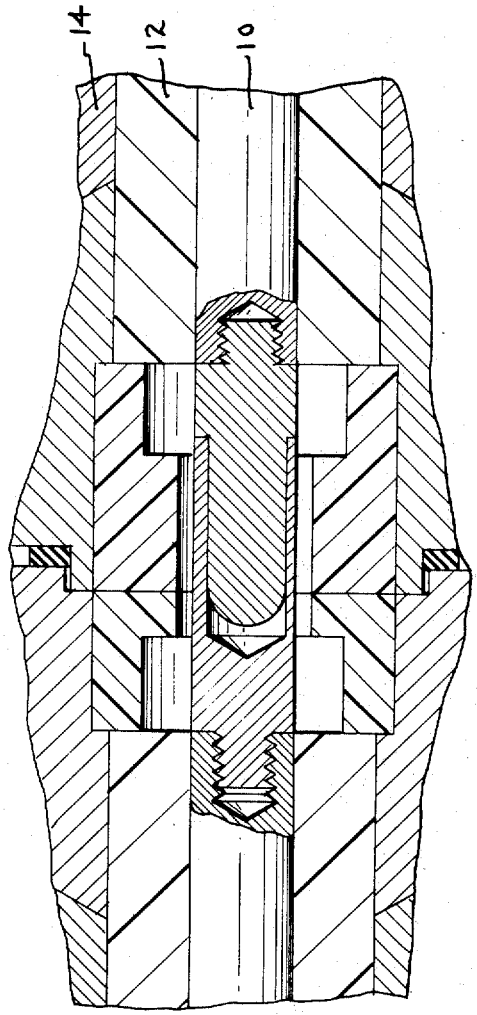
Fig. 5A
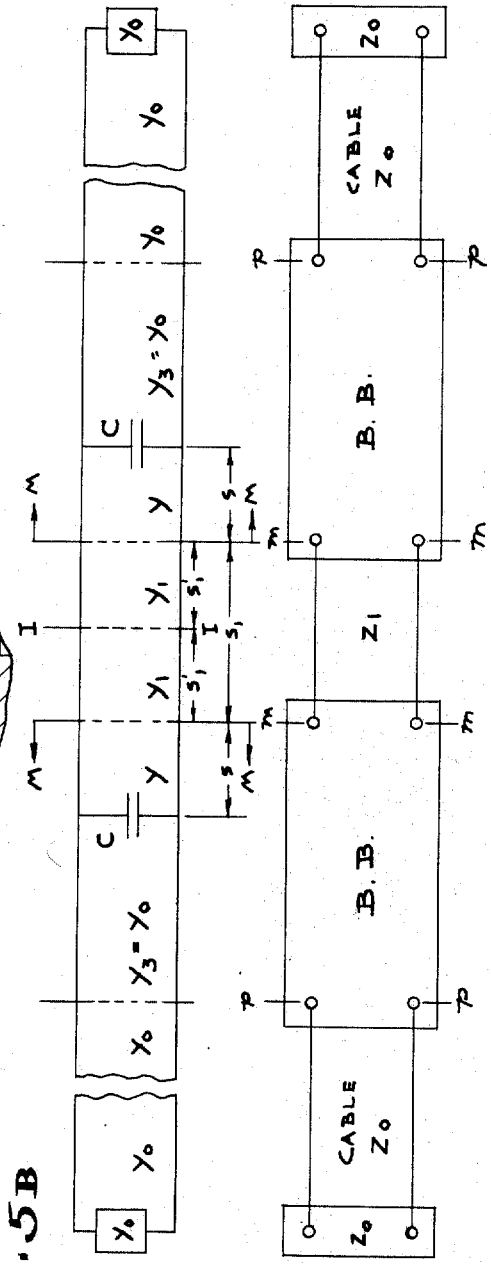
Fig. 5B
Fig. 5C
INVENTOR.
GEORGE WILLIAM ZIEGLER, JR.
BY Curtis, Morris & Safford

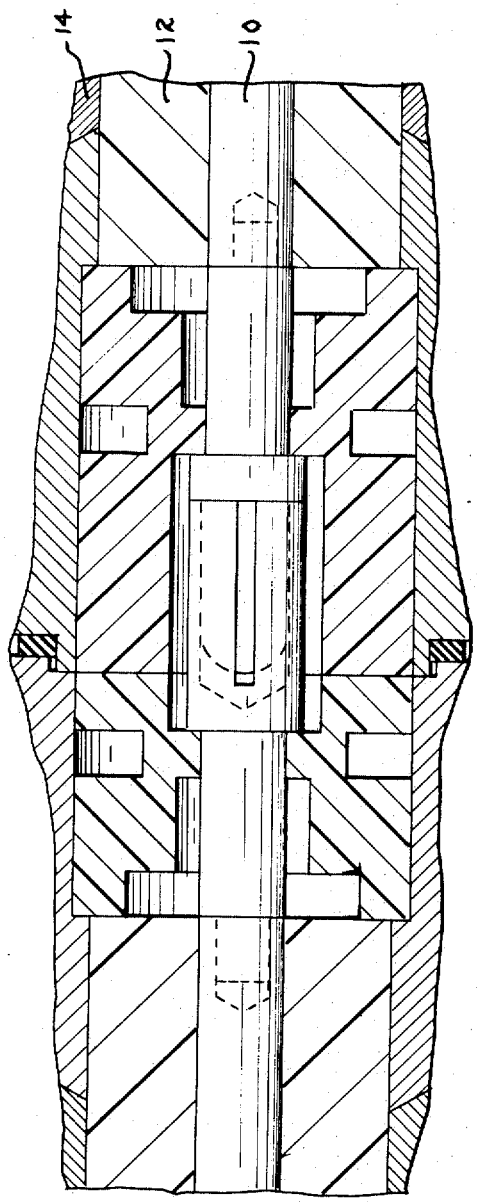
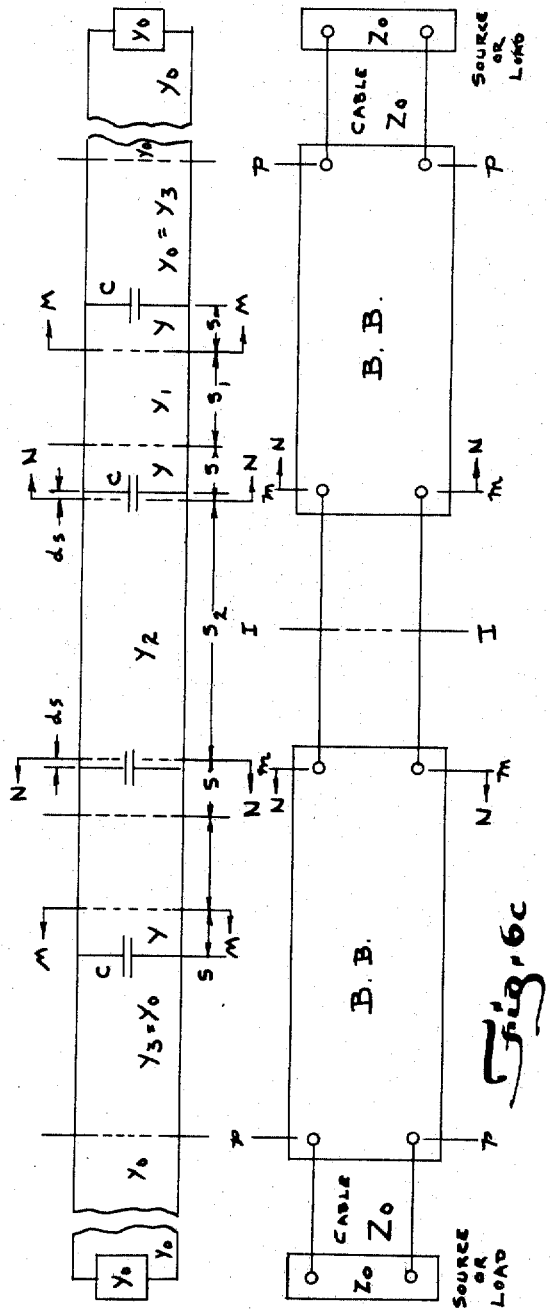

INVENTOR.
GEORGE WILLIAM ZIEGLER, JR
BY

Jan. 27, 1970  G. W. ZIEGLER, JR  3,492,605
HIGH FREQUENCY TRANSMISSION DEVICES AND METHODS OF COMPENSATION
Filed Oct. 14, 1964  6 Sheets-Sheet 6

INVENTOR.
GEORGE WILLIAM ZIEGLER, JR.
BY Curtis, Morris & Safford

United States Patent Office 3,492,605
Patented Jan. 27, 1970

3,492,605
HIGH FREQUENCY TRANSMISSION DEVICES AND METHODS OF COMPENSATION
George William Ziegler, Jr., Carlisle, Pa., assignor to AMP Incorporated, Harrisburg, Pa.
Filed Oct. 14, 1964, Ser. No. 403,900
Int. Cl. H03h 7/38
U.S. Cl. 333—33     11 Claims

ABSTRACT OF THE DISCLOSURE

A broadband compensation technique is disclosed for use with high frequency signal carrying apparatus, including transmission lines, coaxial connectors and the like having discontinuities theren occasioned by diameter and/or impedance changes in at least a section thereof. The technique features a control of dimensions in the section containing discontinuities to provide electrically symmetrical halves on either side of a central normal plane of the section which provides a susceptance equal to zero at a first frequency at the section end with a conductance match at such first frequency. The length of section is adjusted at a second frequency to provide an admittance match with the characteristic admittance of the line to which the apparatus is connected. The invention technique contemplates provision of a compensation including at least two of the previously mentioned sections having a third section therebetween with the electrical length of the third section adjusted at a third frequency to provide an admittance match to the characteristic admittance of the line to which the section is connected.

BACKGROUND OF THE INVENTION

In the transmission of high frequency signals the usual figure of merit is one of efficiency or lack of signal loss. This is expressed by a ratio of standing wave voltage ratio developed in a particular line relative to an optimum unit of voltage ratio for ideal energy transfer (VSWR=1.000). Several factors have been found to cause standing waves, including the presence of any difference in the characteristic impedance ($Z_0$) of the line relative to the $Z_0$ of the line load or the line signal source. A further principal cause of losses incident to standing waves and thus high VSWR is attributable to changes in the line conductor spacing; particularly, abrupt changes.

An ideal transmission line would include a line, load and source, all of approximately equal $Z_0$, with constant spacing between conductors of constant geometrical configuration. The typical transmission line, for reasons of practicality, includes substantial impedance and spacing changes necessitated by mechanical considerations in providing connectors, splicers, terminals and at times cable size changes. Because of this a considerable effort has been put forth to compensate for the electrical discontinuities represented by the foregoing. Usually this compensation takes the form of a compensator section or sections having lengths and conductive path shaping to provide characteristic impedances in accordance with empirically developed designs.

One typical compensating scheme attributed to Dr. O. M. Salati and told in his U.S. Patent No. 2,540,012 includes compensator sections of different characteristic impedance $Z_n$ and length $S_n$ made to average out to the characteristic impedance $Z_0$ of the transmission line in accordance with:

$$\frac{\sum_{n=1}^{\infty} S_n Z_n}{\sum_{n=1}^{\infty} S_n} = Z_0$$

This method requires that the compensating sections be of a length $S_n$ inappreciable as compared with the wave length of the frequency of the signal transmitted. Since, as signal frequency goes up its wave length gets shorter, the so-called high-low method is practically limited to the low frequency range; i.e., several hundred megacycles.

A further method postulated by J. W. E. Griemsmann in his "Handbook of Design and Performance of Cable Connectors for Micro-Wave Use"; Bu-Ships Index No. NE110718; May 1956, and described in a modified form in my co-pending application, Ser. No. 276,714 filed Apr. 30, 1963, utilizes a short section $S_n$ where $Z_n$ is greater than $Z_0$ and sections of substantial length $S_n$ where $Z_n$ is equal to $Z_0$. Practical physical limitations in transmission lines work at times to impose limitatons on the use of the immediately foregoing approaches. For one thing, certain necessary discontinuities may be best handled by a compensating section, with $Z_n$ greater than $Z_0$ or $Z_n$ less than $Z_0$, or without an averaging of the sections as taught by Dr. Salati. Furthermore, with the prior art approaches a single discontinuity cannot be compensated by a single matching section for more than a single frequency, and connector specifications today call for a low VSWR over a broad band of frequencies. That part of the technique of my earlier filed application Ser. No. 276,714 common with Griemsmann, which employs two equal discontinuity capacitances spaced a short distance apart with a compensation section therebetween is not always physically convenient and can, in certain arrangements, result in electric field interaction. If this occurs, the usual calculation for computing discontinuity capacitance becomes inadequate since it is dependent upon radial field line lengths existing between the inner and outer conductors of the transmission line.

There is then a present need for additional methods and devices which compensate for transmission line changes over a broad band of signal frequencies, with some latitude or choice of compensation for a given section length and physical position. It is this need which the present invention purports to answer.

SUMMARY OF THE INVENTION

This invention relates to compensation devices and techniques for high frequency transmission lines and particularly for connectors and like devices which function as transmission lines for the transmission of high frequency signals.

It is a general object of the invention to provide a method whereby a choice of compensator lengths for each of a number of compensators may be made and a method wherein a multiplicity of compensations may be utilized to permit an overlap of compensation for redundancy of compensation.

It is a further object to provide means for combining various methods of compensation so as to provide overall broad band compensation with maximum flexibility of choice of physical and electrical parameters.

It is still a further object to provide a device which may be utilized to perform low-loss signal transmission through necessary changes in transmission lines including connectors, splices and the like.

It is another object to provide a means and method for handling signal discontinuity capacitances.

It is yet another object to provide compensation for pairs of discontinuity capacitances which are physically separated by appreciable lengths.

It is still another object to provide compensation through sections having appreciable lengths of characteristic impedance $Z_n$ greater than $Z_0$ and/or $Z_n$ less than $Z_0$.

It is still another object to provide means and methods for compensating equal discontinuity capacitances and/or equal frequency admittances combined with a discontinuity capacitance.

It is to be understood that the scope of the invention is not to be totally limited to the specific examples which are hereinafter given and that the principles laid down by the invention may be employed by those skilled in the art in equivalent circuits.

In the drawings:

FIGURE 4A is a longitudinal section of a coaxial connector attached to coaxial cables forming a transmission line to relate one aspect of the invention to a physical embodiment; FIGURES 4B and 4C being schematic equivalent circuits thereof;

FIGURES 5A–5C and 6A–6C are diagrams similar, respectively, to those of FIGURES 4A–4C, but of further aspects of the invention;

FIGURE 10A is a longitudinal section of a coaxial splice to coaxial cables of different sizes to show yet another aspect of the invention with FIGURE 10B being an equivalent electrical circuit diagram for the line which FIGURE 10A represents.

Figure 1:
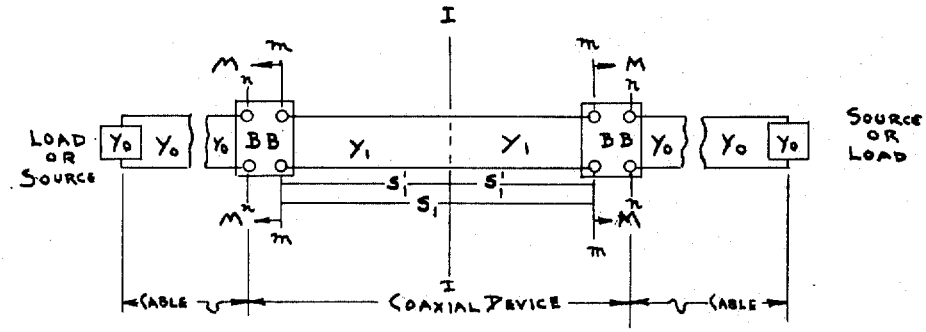
FIGURE 1 is a circuit schematic diagram depicting a transmission line having components organized to explain a general aspect of the compensation of the invention.

Referring now to FIGURE 1, there is depicted a schematic diagram of a transmission line extended between a transmitter or source of high frequency signals and the load supplied thereby. The transmission line includes portions of cable connected to the source and to the load with a coaxial device inserted therebetween. The coaxial device may be considered as a connector, splice or even a portion of cable of diameter or characteristic impedance different from that of the cable attached to the source or load. At the end portions of the coaxial device are four-terminal networks, BB, which may be considered as any passive network of elements. From the description hereinafter to be given it will be seen that the network elements are or may be made up of portions of the coaxial device itself. The connection between the cable and the coaxial device may be considered as through the outboard terminals of a network BB, with the connection to an inner portion of the coaxial device being made to the same network inboard terminals.

With respect to the source and load, and with respect to the portions of cable connecting such to the coaxial device in FIGURE 1, each is made to have a characteristic admittance $Y_0$. The coaxial device is made to be such that it is electrically symmetrical about a coaxially normal plane I—I. Thus, in each half of the coaxial device extending from the inboard terminals of the networks BB, portions of equal characteristic admittance $Y_1$, each of an equal length $S'_1$ are provided to make up a total length equal to $S_1$. Viewed at coaxially normal planes $m$—$m$ at distances $S'_1$ from the plane of symmetry I—I, the admittance $Y_M$ looking toward the load, or toward the source, may be expressed as $Y_M = G_M + jB_M$.

In the general case, $Y_M$ varies with frequency and at some frequency $f$, the susceptance $B_M$ will be equal to zero. If then, at frequency $f$, the admittance $Y_1$ of the portion of lengths $S'_1$ is made to be equal to the conductance $G_M$ viewed from plane $m$—$m$, from the above equation an admittance match will be obtained at the plane $m$—$m$. An admittance match may be obtained at the normal plane I—I by choosing a second and different frequency $f'$ and calculating the length $S'_1$ to produce the match. The following equation has been developed for ascertaining $S_1$ and thus $S'_1$ ($S'_1 = \frac{1}{2} S_1$).

$$S_1 = \frac{C_0}{\pi f' \sqrt{K_1}} \tan^{-1}(a \pm \sqrt{a^2 + 1})$$

(Equation 1)

where $$a = \frac{Y_1^2 - B_M'^2 - G_M'^2}{2 B_M' Y_1}$$

and where the particular value of $Y_M$ at frequency $f'$ is $Y_M' = G_M' + jB_M'$ and the effective dielectric constant of the coaxial sections of characteristic admittance $Y_1$ is represented as $K_1$. The quantity $c_0$ is the velocity of light in free space. In using Equation 1, the absolute quantity of "$a$" must be held to be greater than or equal to unity in order to avoid results which will yield imaginary lengths for $S_1$.

The foregoing represents a general case which is capable of as many solutions as there are finite values for the parameters $f$, $f'$, $K_1$ and the line conductor diameters and spacing. As such, the method may be related to a variety of practical situations encountered in dealing with different transmission line problems.

Figure 2:
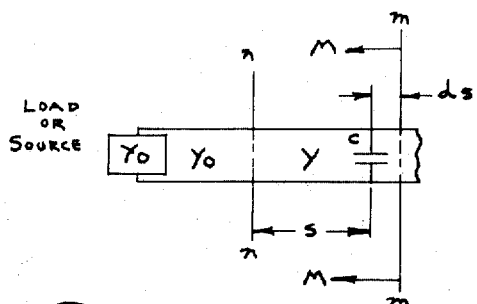
FIGURES 2 and 3 are circuit diagrams of partial transmission lines having components organized to explain special cases of the compensation of FIGURE 1.
Figure 3:
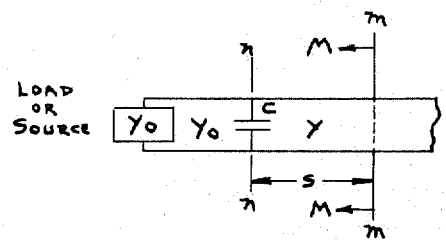

Turning now to examples of such and to useful methods of obtaining $B_M = 0$, reference is made to FIGURES 2 and 3. In FIGURE 2, a portion of cable is terminated to a load or a source having a characteristic admittance $Y_0$ equal to that of a cable as above. Consider that mechanical requirements dictate the existence of an abrupt change in characteristic impedance or in conductor diameter representing a discontinuity capacitance C within the section between the coaxially normal planes $n$—$n$ and $m$—$m$. To obtain the condition $B_M = 0$ at frequency $f$ with a conductance match to the characteristic admittance as above, the length S from plane $n$—$n$ to C located an infinitesimal distance away from the coaxially normal plane $m$—$m$ might be made equal to some multiple of a half wave length of the frequency $f$. This would provide a conductance match, but no cancellation of susceptance values and no susceptance match. To provide a susceptance match at frequency $f$ the length S of characteristic admittance Y is adjusted from a calculation according to the following equation:

$$S = \frac{C_0}{2\pi f \sqrt{K}} \tan^{-1}(a \pm \sqrt{a^2 - b})$$

where (Equation 2)

$$a = \frac{Y(Y_0^2 - Y^2)}{4\pi f C Y_0^2}$$

and $$b = \left(\frac{Y}{Y_0}\right)^2$$

To avoid obtaining imaginary lengths for S, the absolute difference between the characteristic admittances, $Y_0$ and Y must be held to be greater than or equal to the quantity $$\frac{2\omega C Y_0}{Y + Y_0}$$

where $\omega = 2\pi f$.

FIGURE 3 shows a practical example wherein some load or source of high frequency signals having a characteristic admittance $Y_0$ is terminated by a cable of $Y_0$ to a coaxial section existing between coaxially normal planes n—n and m—m with a discontinuity capacitance C disposed in the plane n—n. As with the arrangement in FIGURE 2, a conductance match will not provide a susceptance cancellation between the section and the cable. In accordance with my invention, a susceptance match is obtained at the frequency $f$ by adjusting the length S according to the equation:

$$S = \frac{C_0}{2\pi f \sqrt{K}} \tan^{-1}(b \pm \sqrt{b^2+1})$$

where (Equation 3)

$$b = \frac{Y^2 - Y_0^2 - \omega^2 C^2}{2\omega C Y}$$

In the above examples, the Equations 1, 2 and 3, which determine appropriate section lengths, are capable of a large number of solutions for the positive sign of the radicals and an equally large number of solutions for the negative sign of the radicals. In most cases the shortest length obtainable by a given solution is preferred, since it provides the most economical and feasible structure to achieve a low VSWR versus frequency characteristic. The value of the characteristic admittance $Y_n = Z_n^{-1}$ used for a compensator is, as mentioned, controlled by the necessity of obtaining real solutions with respect to the equations. Furthermore, when $Z_n$ is greater than $Z_0$, the greater the ratio of $Z_n$ to $Z_0$, the shorter the compensating section and the better the compensation at intermediate frequencies. When $Z_n$ is less than $Z_0$ it is often best to set $Z_n$ to a value as near to $Z_0$ as is possible to reduce the magnitude of VSWR at intermediate frequencies. The lengths obtained for $S_1$ may constitute an appreciable part of the length of the device. In providing $Y_1 = G_M$, values greater than $Y_0$ and less than $Y_0$ are required, depending upon the frequency and magnitude of mismatch offered by a given design situation and depending upon the choice of solutions to the equations.

Turning now to a more specific application of the principles relating to the use of the Equations 1, 2 and 3, reference is made to FIGURES 4A–4C. In FIGURE 4A a section of a transmission line 8 is shown to include portions of coaxial cable interconnected by a coaxial connector. The cable is comprised of a center conductor 10 surrounded by a dielectric material 12, in turn surrounded by an outer conductor 14. Typical cable includes a center conductor of copper tubing, a dielectric material of foamed polyethylene and an outer conductor of aluminum tubing.

The connector shown as 20 is comprised of connector halves 22 and 42 of conductive material, each having a similar outer configuration to include a rear sleeve extension such as 24, mechanically connected to the cable by a locking ring such as 26. The forward end of the outer conductive shell of each half includes means for effecting a mechanical connection. The interior of each shell is shaped as shown to define a first bore extending through the extension 24 of a diameter equal to the inner diameter of the cable outer conductor 14, with a reduced diameter bore being formed forwardly thereof through an abrupt face such as 28. Fitted within each connector half is a dielectric bead such as 30, shown in half 22, which is undercut to define a first bore such as 34 and a further bore such as 36. Fitted within the bead bore of each half is a center contact member such as 38, shown in half 22, having its rearward end terminated to the cable center conductor and its forward end shaped to provide the engagement indicated. The diameter of the center contact members are made constant and equal to the diameter of the cable center conductor 10. A description of the type of connector shown in FIGURE 4A is given in greater detail in my co-pending application Ser. No. 308,265, filed Sept. 11, 1963.

FIGURE 4B depicts the schematic equivalent of the transmission line of FIGURE 4A and FIGURE 4C shows schematically a further equivalent including four-terminal networks BB. A source or load of characteristic admittance $Y_0$ is connected by a cable of characteristic admittance $Y_0$ which extends up to the coaxial device through a section of characteristic admittance $Y_2$. In FIGURE 4C this section is shown as including part of the four-terminal network BB and relative to the connector of FIGURE 4A, through the maintenance of constant conductor diameters, $Y_2$ is made to be equal to $Y_0$. The section of length S shown in FIGURE 4B corresponds to the first section of the connector half with the face 28 and the corresponding undercut of the dielectric bead 30 being shown as a discontinuity capacitance. Thereafter, the next section proceeding toward the electrically symmetrical center through plane I—I is of a length $S'_1$ which is held to be of characteristic impedance $Y_1$; the corresponding section 42 adding thereto for a length of $S_1$ of characteristic impedance $Z_1$ relative to FIGURE 4C. The control of characteristic admittances for the various sections is physically accomplished as is shown in FIGURE 4A, by the undercutting of a dielectric bead of selected material to provide a suitable dielectric constant K seen by the electric field in conjunction with a controlled spacing between the inner and outer conductive paths. The paths are made to be of lengths S, $S_1$ and $S'_1$ calculated in accordance with the equations given above.

Thus, FIGURES 4A–4C as viewed from plane M—M correspond to the application depicted in FIGURE 2 and Equation 2 is utilized to calculate the length S at a frequency $f$. At the frequency $f$ the value of $Y_1 = G_M$ is computed by well established equations. FIGURE 4C will be seen to be equivalent to FIGURE 1 and at the frequency $f'$ the values of $S_1$ giving an admittance match may be computed using Equation 1.

Referring now to FIGURES 5A–5C a physical representation of a transmission line of different characteristics is shown. As with respect to FIGURE 4A, the representation is of a connecting device or coaxial connecter interposed between coaxial cables having a center conductor 10 surrounded by a dielectric 12 and an outer conductor 14, the outer conductive portions of the connector may be considered as like those in FIGURE 4A and the general arrangement of the inner portions include the same components; namely, center contact members and dielectric beads. It will be observed that the physical arrangement introduces a discontinuity capacitance in each connector half by an enlargement of the outer conductive path in the plane wherein the center conductor of the cable ends and the center contact member begins. The inner bore of the connector between the enlargements of each half is constant along the length of the connector and the center contact members of the connector are also of a constant diameter and equal to that of the cable center conductor. The bead is adjusted by undercuts to provide compensation in accordance with the invention.

FIGURE 5B shows schematically an equivalent diagram with source or load characteristic admittance $Y_0$ connected through a cable section of characteristic admittance $Y_0$ to a connector sleeve section of characteristic admittance $Y_3$ made to equal $Y_0$. Continuing through the connector, there is then a section ending in a change in bead diameter at the coaxially normal plane M—M spaced a distance S from the discontinuity capacitance C and of a characteristic admittance Y. From the normal plane M—M to the normal plane I—I at the electrically symmetrical center of the connector there is a section of characteristic admittance $Y_1$ of a length $S'_1$. FIGURE 5C shows the foregoing in terms of a transmission line including the four-terminal networks BB separated by an impedance section $Z_1$ extending between the coaxially normal planes M—M of each connector half. The outboard terminals of BB are represented by the outside ends of the connector at coaxially normal planes p—p with the cable portions of characteristic impedance $Z_0$ connecting loads or sources of characteristic impedance $Z_0$. It will be apparent that the device and circuit shown in FIGURES 5A–5B viewed from M—M represent the equivalent of the circuit of FIGURE 3. The length S is then calculated from the Equation 3 at a frequency $f$ and the value for $Y_1=G_M$ is computed at the frequency $f$. Again FIGURE 5C is equivalent to FIGURE 1 and at a frequency $f'$ the values of $S_1$ to provide an admittance match may be computed using Equation 1.

FIGURES 6A, 6B and 6C show yet a further embodiment employing the principles of the invention in a somewhat more complicated transmission line application. Again, the connector will be seen to interconnect coaxial cable including a center conductor 10, dielectric 12 and an outer conductor 14 through halves including an outer conductor of a given and constant diameter and an inner conductor which includes sections of different diameters. This type of physical representation frequently occurs in connector applications where for mechanical reasons it is necessary to have the inner conductor enlarged at the point of engagement of the center conductive contact members and to provide a corresponding enlargement of the outer conductive portions for compensation. The bead structure shown in the conductive halves demonstrates how a choice of undercutting and overcutting may be employed to provide a desired dielectric constant in various sections and at the same time mechanical support of the center conductive contact members. Beginning at the right side of the transmission line and viewing FIGURES 6A, 6B and 6C, simultaneously, it will be apparent that a load or source is connected by a cable of characteristic admittance $Y_0$ to a portion of the connector of characteristic admittance $Y_3$, which is made equal to $Y_0$. At the point of enlargement of the outer conductive path of the connector there exists a discontinuity capacitance shown as C in FIGURE 6B, followed immediately by a section of length S and a section of length $S_1$ with a further section of S; the three sections having characteristic admittances of Y, $Y_1$ and Y, respectively. The discontinuity capacitance represented by an enlargement of the center conductor is also shown as C and is made equal to the discontinuity capacitance C at the change of the outer conductor by standard procedures. Thereafter, extending along the connector is a section length $S_2$ of characteristic admittance $Y_2$ joining a portion electrically identical to the preceding connector half. The four-terminal networks BB may be considered as extending from the coaxially normal planes n—n corresponding to the end of the section of length $S_2$ out to a coaxially normal plane p—p at the outer ends of the connector. The connector of FIGURE 6A contains a high order of symmetry. The values of S, $S_1$ and $Y_1$ are computed as described with respect to the example of FIGURES 4A–4C. At another frequency $f''$ an admittance match may be obtained by calculating $S_2$ from the equation:

$$S_2=\frac{c_0}{\pi f''\sqrt{K_2}}\tan^{-1}(b\pm\sqrt{b^2+1})$$

Equation 4 where $$b=\frac{Y_2^2-B_N''^2-G_N''^2}{2B_N''Y_2}$$

The value of $Y_2$ in this instance is conveniently equal to $Y_0$; however, any value of $Y_2$ will give an admittance match at $f''$ when Equation 4 is applied.

Compensation may be obtained at yet another frequency $f'''$ by choosing an $f'''$ at which the susceptance $B_M'''$ equals zero; computing $Y_2$ to be equal to $G_M'''$; and then computing $S_2$ at a frequency $f''$, again using Equation 4 with an appropriate substitution of parameters.

Higher degrees of symmetry offer additional choices of frequencies of computation and the extensions of the disclosed principles to other configurations should be obvious from the above examples given. In brief summary, examples have been shown which are typical of the physical changes necessitated by the number of cable sizes and with present production techniques. Included is the situation where in the center conductive members of the coaxial device can be held of constant diameter throughout the length relative to the diameter of the center conductor, but the outer conductor members are of necessity enlarged and the situation wherein the outer conductor members are of constant diameter, but the center conductive members must be changed in diameter. Additionally, the embodiment of FIGURE 6A shows an instance wherein the outer conductor members must be enlarged and the center conductive members must also be enlarged.

Figure 7:
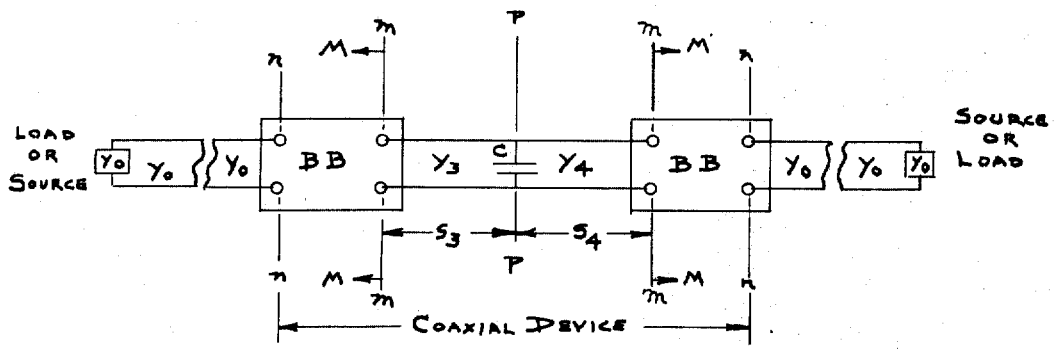
FIGURES 7–9 are each circuit diagrams depicting transmission lines including coaxial devices organized to show still further aspects of the invention.

The foregoing represents the invention applied to typical and general applications. Still further and perhaps equally important applications may be treated using the invention method. One example is shown in FIGURE 7 to represent the general case of a transmission line having a network of electrical elements distributed symmetrically about a coaxially normal plane P—P which contains a discontinuity capacitance C. It will be noted that the diagram for FIGURE 7 is identical to that of FIGURE 1, except for the existence of C in the plane of symmetry.

It has been discovered that an admittance match to $Y_0$, the admittance of the cable and of the source or load, results at a frequency $f'$ when $Y_3$ is made to equal $Y_4$ and the coaxial section length $S_3$ and $S_4$ are computed from the following equation:

$$S_3=\frac{C_0}{2\pi f'\sqrt{K_3}}\tan^{-1}[\mu\pm\sqrt{\mu^2+\nu}]$$

(Equation 5)

where $$\mu=\frac{[Y_3(B_M'^2+\omega CB_M'+G_M'^2Y_3^2)]}{[\omega C(B_M'^2+G_M'^2)-2B_M'Y_3^2]}$$

and $$\nu=\frac{[Y_3^2(\omega C+2B_M')]}{[2B_M'Y_3^2-\omega C(B_M'^2+G_M'^2)]}$$

and $$S_4=S_3\frac{\sqrt{K_3}}{K_4}$$

(Equation 6)

Further compensation may be made if desired by making $Y_3$ equal $G_M$ at some frequency $f$ to achieve an admittance match to $Y_0$; recognizing again that in general, $Y_M=G_M+jB_M$ varies with frequency and at some frequency $f$, $B_M=0$. With this, for a further frequency $f'$, $S_3$ and $S_4$ may be computed from Equations 5 and 6.

In practice it sometimes happens that compensation is called for wherein the absolute value of $B_A$ is greater than $-\frac{1}{2}\omega C$ for all possible real values of the length $S_3$. If $B_A$ is only slightly larger than $-\frac{1}{2}\omega C$, it has been discovered that a practical and useful match results when $S_3$ is computed from:

$$S_3=\frac{C_0}{2\pi f'\sqrt{3}}\tan^{-1}[D\pm\sqrt{D^2+E}]$$

(Equation 7)

when $$D=\frac{[B_M'Y_3(Y_3^2+B_M'^2+G_M'^2)]}{[(B_M'^2+G_M'^2)^2+Y_3^2(B_M'^2-G_M'^2)]}$$

and $$E=\frac{[Y_3^2(G_M'^2-B_M'^2-Y_3^2)]}{[(B_M'^2+G_M'^2)^2+Y_3^2(B_M'^2-G_M'^2)]}$$

and $S_4$ is computed from Equation 6 at a frequency $f'$ at which frequency the admittance viewed from plane M—M is $Y'_M = G'_M + jB'_M$.

Figure 8:
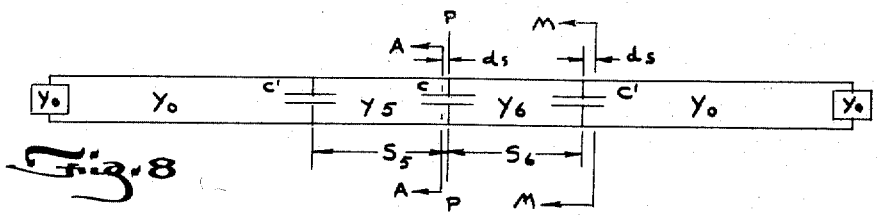

FIGURE 8 is yet a further schematic diagram of a class of coaxial devices terminated at each end in the characteristic admittance $Y_0$ when in use. The physical embodiment of such a device can be visualized from the above examples wherein discontinuity capacitances C are shown as diameter changes. The device has two equal discontinuity capacitances C' spaced lengths $S_5$ and $S_6$ away from a further discontinuity capacitance C residing in the coaxially normal plane of symmetry P—P. The coaxial devices which are represented by FIGURE 8 are typical of both halves of a cable connector, or of each mating half of such connector, or a part of one or both mating halves. Additionally, the devices represented by FIGURE 8 may be a transition between cables of different conductor diameters.

With regard to the device of FIGURE 8, $S_5$ may be computed from Equation 5 for any desired frequency $f'$ by making the appropriate substitution of equivalents. Now, when $B_A$ is greater than $-\frac{1}{2}\omega C$ for all values of $S_5$, the same substitutions may be made in Equation 7 and $S_6$ computed from Equation 6.

Figure 9:
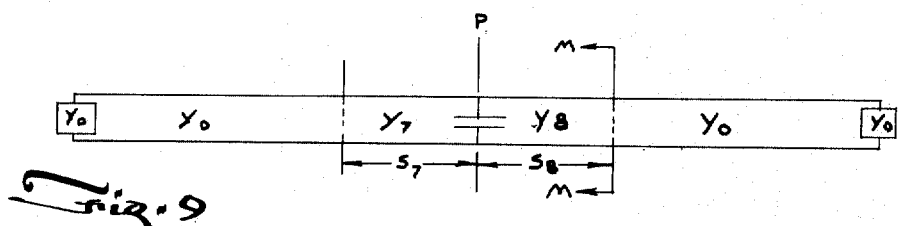

FIGURE 9 is yet a further embodiment showing a schematic diagram of another class o fcoaxial connectors within the scope of the class of FIGURE 7. This class particularly includes coaxial connectors, one or each mating half of such connector, a part of one or both mating halves or, again, a transition between coaxial cables of different conductor diameters. The coaxially normal plane of symmetry P—P includes a discontinuity capacitance C with matching sections of characteristic admittance $Y_7 = Y_8$, spaced from the ends of the connector by lengths $S_7$ and $S_8$, such that:

$$\frac{2\pi f \sqrt{K_7}}{C_0} = \frac{2\pi f \sqrt{K_8}}{C_0} S_8; \quad \beta_8 S_7 = \beta_8 S_8$$

The devices are terminated at each end in the characteristic admittance $Y_0$ when in use and an admittance match to $Y_0$ will result at a frequency $f$ when $S_7$ and $S_8$ are computed from the equations given below:

$$S_7 = \frac{C_0}{2\pi f \sqrt{K_7}} \tan^{-1}[F \pm \sqrt{F^2 + H}]$$

where (Equation 8)

$$F = \frac{Y(Y_0^2 - Y^2)}{\omega C Y_0^2}$$

and $$H = -\left(\frac{Y}{Y_0}\right)^2$$

and where $$S_8 = S_7 \frac{\sqrt{K_7}}{K_0} \quad \text{(Equation 9)}$$

Again, the magnitude of $Y_0^2 = Y_7^2$ must be held to be equal to or greater than $\omega C Y_0$.

The single discontinuity capacitance presented in FIGURE 9 could result from an abrupt change in diameter of the outer conductor as shown above in FIGURE 4A or from an abrupt change in diameter of the center conductor as shown in FIGURE 6A, and such can be treated as previously covered.

Figure 10A:
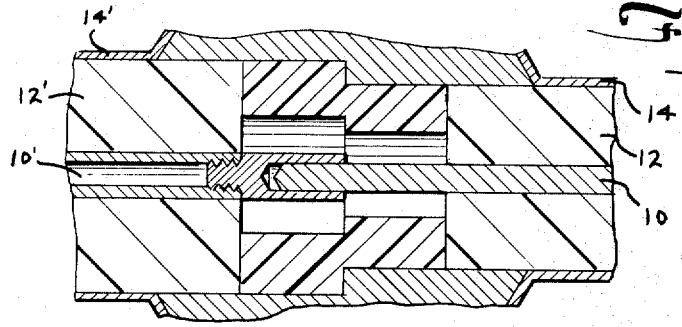
Figure 10B:
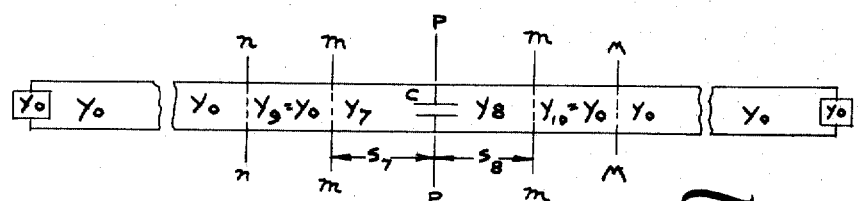

FIGURES 10A and 10B depict a transmission line application wherein the coaxial device represents a splice between cables of different diameter. Thus, the cable including a center conductor 10, dielectric 12 and outer conductor 14 is mated with a cable having corresponding parts 10', 12' and 14' each of a larger diameter through a coaxial device constructed in accordance with the invention. In the section between coaxially normal planes n—n and m—m, a characteristic admittance $Y_{10}$ is made to be equal to the characteristic admittance $Y_0$ of the cable and a load or source of signals. The next coaxial section which extends between the coaxially normal plane m—m to the electrically symmetrical center plane of the device P—P includes a characteristic admittance $Y_8$ of a length $S_8$ and, as can be seen in the physical sample, such is of a constant configuration with respect to the center and outer conductive paths. At the symmetrical center are changes in the outer conductive member diameter and the center conductive member diameter as well as in the dielectric bead to present a discontinuity capacitance C. Extending from the plane P—P further through the connector device is a section of characteristic admittance $Y_7$ of length $S_7$ which is of constant configuration with respect to the center and outer conductive members and the dielectric bead. In these sections, $Y_7$ is made to be equal to $Y_8$ and greater than $Y_0$. Next is a further section of characteristic admittance $Y_9$, which is made to be equal to the characteristic admittance of the cable and load or source $Y_0$. In this embodiment the dielectric bead is undercut as shown or it could be overcut in the manner previously described, or both undercut and overcut to provide an appropriate dielectric constant. The diameters for making $Y_7$ equal to $Y_8$ and for holding the value of $Y_7$ to be greater than $Y_0$ may be accomplished by standard equations. The embodiment of FIGURES 10A and 10B corresponds to the general class of coaxial connectors represented by FIGURE 7, and the particular class represented by FIGURE 9.

Turning now to a description intended to relate the foregoing to physical parameters, a number or procedures and data plots will be explained relative to the embodiment of FIGURES 10A–10B. From this those skilled in the art should readily appreciate the advantages in the various embodiments as well as further aspects of the invention.

Figure 11:
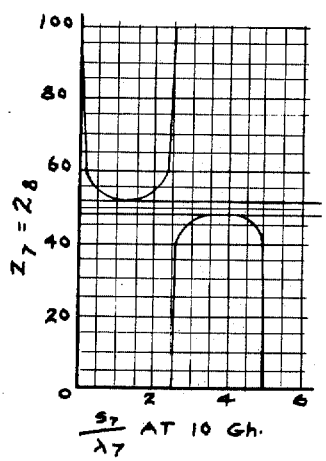
FIGURES 11–14 are plots of parameters relating physical values to the principles of the invention.

As in the practice heretofore indicated, a first step is to pick some frequency $f$ and solve for the section length. Choosing $f = 10$Gh., FIGURE 11 shows the values of the ratio of length $S_7$ to the signal wave length $\lambda_7$ (for a VSWR=1.000 at 10Gh. and $K_7$ normalized to unity) related to the impedance $Z_7$ of the section with $Z_8$ being made to equal $Z_7$. The length $S_7$ is computed by Equation 8 with C=0.025 MMF and $Z_0 \simeq 50$ ohms. From the limitation imposed on the use of Equation 8 with the magnitude of $Y_0^2 - Y_7^2$ being held to be equal to or greater than $\omega C Y_0$, it will be apparent that $Z_7$ and $Z_8$ each is greater than or equal to 48.1 ohms and less than or equal to 52.1 ohms.

Figure 12:
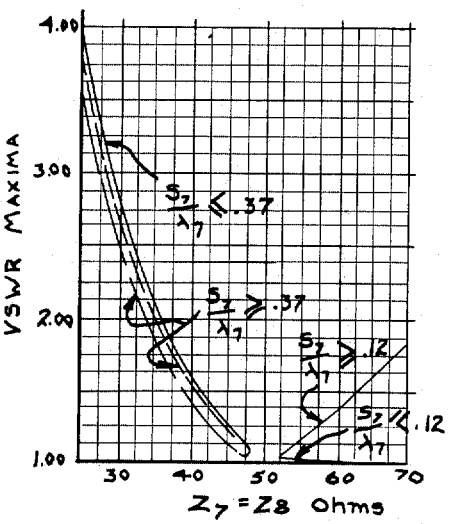

The smallest value of $S_7$ for each sign of the radical from the use of Equation 8 was used to construct FIGURE 11. As shown in FIGURE 12, the longer of these values, $S_7/\lambda_7$ greater than or equal to 0.37, produces a double set of maxima in the plot of VSWR versus the impedance $Z_7$ equals $Z_8$ for values less than or equal to 48.1 ohms. Useful compensation results with longer compensators in the regions wherein $Z_7$ is equal to $Z_8$ and $Z_7$ is greater than or equal to 45 ohms and less than or equal to 48.1 ohms and, additionally, where $Z_7$ is greater than or equal to 52.1 ohms and less than or equal to 56 ohms. With the shorter compensators, excellent compensation results with $Z_7$ equal to $Z_8$ and greater than or equal to 52.1 ohms.

Figure 14:
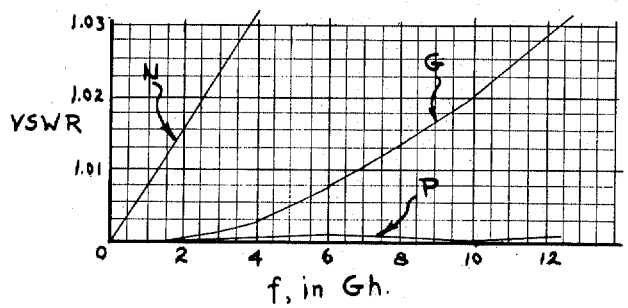
Figure 13:
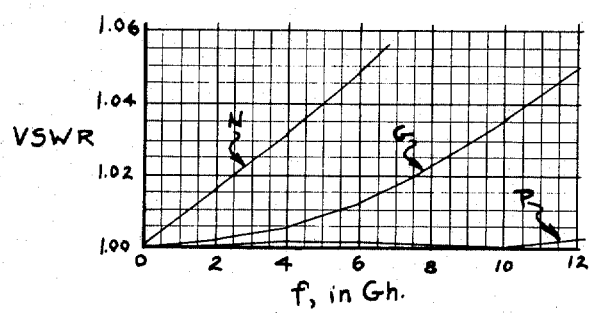

FIGURE 14 is a plot of VSWR versus frequencies $f$ for various parameters of FIGURE 10A. When $Y_7$ is made to equal $Y_8$ and equal to 0.0200 mho, there is no compensation and the curve N results. With $Z_7$ equal to 50 ohms and $Z_8$ equal to 55 ohms and with $S_8$ adjusted by the only available prior art method, a useful compensation is obtained as indicated by the line marked G in FIGURE 13. With $Z_7$ made equal to $Z_8$ and equal to 55 ohms, $S_7$ computed by Equation 8, and with $S_8$ being computed from Equation 9, the curve P results. The effective dielectric constants in the foregoing are again normalized to unity; $K_7=K_8=1.00$. The compensation is thus shown to be excellent over a broad band of frequencies and is perfect (VSWR=1.00) at the frequency of compensation. $f=10$Gh. The normalized lengths $S_8$ and $S_7$ for a wide range of designs belong to the class represented by FIGURE 9 may be readily converted to a specific design by dividing respective lengths by the square root of the actual effective dielectric constant. The lengths $S_7$ and $S_8$ are not necessarily the same.

A similar comparison is made in FIGURE 14 wherein $Z_n=Z_8$ is equal to 50 ohms with resulting curve N. For the curve P, $Z_7$ is made equal to $Z_8$, both equal to 60 ohms, $S_7$ is computed from Equation 8, and $S_8$ from Equation 9. For the curve G, $Z_7$ equal to 50 ohms, $Z_8$ equal to 60 ohms, $S_8$ was adjusted by the only available prior art method. Compensation obtained with 60 ohm compensators is greater than with 55 ohm compensators.

The principles and practices herein disclosed have been applied to devices for transmission lines of a considerable range of conductor diameters through a wide variety of dielectric materials and several types of dielectric construction. This has been done in cables having solid and stranded conductors and in cables having tubular center conductors. Coaxial connector devices have been manufactured to ordinary production tolerances tested by a number of separate methods for measuring VSWR and substantial improvements have been found to be occasioned by the use of the invention.

I claim:

1. In a transmission line operating at microwave frequencies and terminated to a substantially matched load and source, a connection therefor providing a discontinuity and including a compensating section comprised of first and second conductive surfaces separated by a dielectric medium and of radial dimensions to provide an admittance relationship $Y_M=G_M+jB_M$ at some frequency $f$ when viewed outwardly at coaxially normal plane M located by a length $S_1$ from the section end, inwardly of the plane, the said section dimensions providing characteristic admittance $Y_1$ with an effective dielectric constant $K_1$ wherein $Y_1$ is equal to $G_M$ for a conductance match and $B_M$ is equal to zero for an admittance match and at a second frequency $f'$ for admittance $Y_M'=G_M'+jB_M'$, when the length is $$S_1=\frac{c_0}{\pi f'\sqrt{K_1}}\tan^{-1}(a\pm\sqrt{a^2+1})$$

where $$a=\frac{Y_1^2-B_M'^2-G_M'^2}{2B_M'Y_1}$$

to produce a susceptance match at the second frequency.

2. The line of claim 1 including at least a pair of said first sections axially separated by a second section of a length $S_2$ having first and second conductive surfaces separated by a dielectric medium and of radial dimensions to provide a characteristic admittance $Y_2$ and effective dielectric constant $K_2$, the said second section having an admittance relationship $Y_N''=G_N''+jB_N''$ at a third frequency $f''$ when viewed outwardly from coaxially normal planes N at the ends of said further section, when the length is $$S_2=\frac{c_0}{\pi f''\sqrt{K_2}}\tan^{-1}[b\pm\sqrt{b^2+1}]$$

where $$b=\frac{Y_2^2-B_N''^2-G_N''^2}{2B_N''Y_2}$$

3. The line of claim 1 including at least a pair of said first sections separated by third section of length $S_2$ having first and second conductive surfaces separated by a dielectric medium and of radial dimensions to provide characteristic admittance $Y_2$ and effective dielectric constant $K_2$, the said third section having a susceptance $B_N'''$ equal to zero at a fourth frequency $f'''$ with $Y_2=G_N'''$ when viewed outwardly from coaxially normal planes N at the ends of the third section and where at a third frequency $f''$ the length $$S_2=\frac{c_0}{\pi f''\sqrt{K_2}}\tan^{-1}[b\pm\sqrt{b^2+1}]$$

where $$b=\frac{Y_2^2-B_N''^2-G_N''^2}{2B_N''Y_2}$$

and the admittances at the planes N at $f''$ are $$Y_N=G_N''+jB_N''.$$

4. In a transmission line operating at microwave frequencies and of characteristic admittance $Y_0$ terminated to a substantially matched load and source, a connection therefor including a compensating section and comprised of first and second conductive surfaces separated by a dielectric medium and of radial dimensions to provide in a normal plane P thereof at least a discontinuity capacitance C electrically symmetrically disposed between portions of length $S_1$ dimensioned to provide a characteristic admittance $Y_1$ having an effective dielectric constant $K_1$ and length $S_2$ of characteristic admittance $Y_2$ equal to $Y_1$ with $K_2$ being the effective dielectric constant and where the length $$S_1=\frac{c_0}{2\pi f\sqrt{K_1}}\tan^{-1}[F\pm\sqrt{F^2+H}]$$

with $$F=\frac{Y_1(Y_0^2-Y_1^2)}{\omega C Y_0^2}$$

$$H=-\left[\frac{Y_1}{Y_0}\right]^2$$

and the length $$S_3=S_1\sqrt{\frac{K_1}{K_3}}$$

and wherein the electrical symmetry provides a conductance match in the normal plane P and the computed lengths $S_1$ and $S_2$ provide a susceptance match in the normal plane P.

5. In a transmission line of characteristic admittance $Y_0$ terminated in a substantially matched load and source the compensating device including at least a first section of length $S_3$ and characteristic admittance $Y_3$ with an effective dielectric constant $K_3$, as viewed at the section end toward the load; a second section of length $S_4$ and characteristic admittance $Y_4$ with an effective dielectric constant $K_4$, as viewed at the section end toward the source; and with $Y_4$ equal to $Y_3$ and discontinuity capacitance $C'$ at opposite ends of each said section with a discontinuity capacitance C at near ends of each said section and where at a frequency $f'$ $$S_3=\frac{c_0}{2\pi f'\sqrt{K_3}}\tan^{-1}[\mu\pm\sqrt{\mu^2+v}]$$

where $$\mu=\frac{[Y_3(\omega^2 C'^2+\omega^2 CC'+Y_0^2-Y_3^2]}{[\omega C(\omega^2 C'^2+Y_0^2)-2\omega C Y_3^2]}$$

and $$v=\frac{[\omega Y^3(C+2C')}{[2\omega C'Y_0^2-\omega C(\omega^2 C'^2+Y_0^2)]}$$

and $$S_4=S_3\sqrt{\frac{K_3}{K_4}}$$

6. In a transmission line connected to a substantially matched load and source via a compensating section having a central plane P containing a discontinuity capacitance C and end planes Q with portions therebetween which, when viewed from plane P, are of length $S_3$, characteristic impedance $Y_3$ and effective dielectric constant $K_3$ and of length $S_4$, characteristic admittance $Y_4$ of effective dielectric constant $K_4$ with $Y_4$ equal to $Y_3$ the said section when viewed outwardly from planes Q having $Y'_Q = G'_Q + jB'_Q$ wherein at a frequency $f'$ $$S_3 = \frac{C_0}{2\pi f' \sqrt{K_3}} \tan^{-1} [\mu \pm \sqrt{\mu^2 + \nu}]$$

where $$\mu = \frac{[Y_3(B_Q'^2 + \omega C B_Q' + G_Q'^2 - Y_3^2]}{[\omega C(B_Q'^2 + G_Q'^2) - 2B_Q Y_3^2]}$$

$$\nu = \frac{[Y_3^2(\omega C + 2B_Q')]}{[2B_Q' Y_3^2 - \omega C(B_Q'^2 + G_Q'^2)]}$$

and $$S_4 = S_3 \sqrt{\frac{K_3}{K_4}}$$

7. The line of claim 6 wherein $B_Q$ is equal to zero at frequency $f$ and $Y_3$ is equal to $G_Q$ at the frequency $f$.

8. In a transmission line connected to a substantially matched load and source via a compensating section having a central plane P containing a discontinuity capacitance C and end planes Q with portions therebetween which, when viewed from plane P, are of length $S_3$, characteristic admittance $Y_3$ and effective dielectric constant $K_4$ and of length $S_4$, characteristic admittance $Y_4$ of dielectric constant $K_4$ with $Y_4$ equal to $Y_3$, the said section when viewed from planes Q having $Y_Q = G_Q + jB_Q$ wherein at a frequency $f'$, $|B'_Q|$ is greater than $-\tfrac{1}{2}\omega'C$ and $$S_3 = \frac{C_0}{2\pi f' \sqrt{K_3}} \tan^{-1} [D \pm \sqrt{D^2 + E}]$$

where $$D = \frac{[B_Q' Y_3(Y_3^2 + B_Q'^2 + G_Q'^2)]}{[(B_Q'^2 + G_Q'^2) + Y_3(B_Q'^2 + G_Q'^2)]}$$

$$E = \frac{[Y_3(G_Q'^2 - B_Q'^2 - Y_3^2)]}{[(B_Q'^2 + G_Q'^2) + Y_3(B_Q'^2 - G_Q'^2)]}$$

and $$S_4 = S_3 \sqrt{\frac{K_3}{K_4}}$$

and where $\omega' = 2\pi f'$.

9. In a method for providing compensation for transmission line ciscontinuities occasioned by diameter and/or impedance changes in at least a section thereof due to connections therein and operating at microwave frequencies, including the steps of producing a conductance match by dimensioning the said section to be electrically symmetrical relative to a central normal plane, selecting a first frequency at which the susceptance is zero at normal planes at the section ends as viewed outwardly, further providing a conductance match at the said normal planes and then providing an electrical length for a central section which at a second frequency provides an admittance match to the characteristic admittance of the line.

10. The method of claim 9 including as further steps providing at least two of said sections and lengths, providing a third section therebetween wherein the electrical length of said third section at a third frequency is selected to provide an admittance match to the characteristic admittance of the line.

11. The method of claim 9 including as a further step the provision of at least two of said sections, providing a third section therebetween with the third section length at a third frequency being made to provide an admittance match to the characteristic admittance of the line, the characteristic admittance of said third section being made to provide a conductance match at a fourth frequency at which there is a susceptance match at the third section ends.

References Cited

UNITED STATES PATENTS

| | | | |
|---|---|---|---|
| 3,350,666 | 10/1967 | Zeigler | 333—33 |
| 3,076,158 | 1/1963 | Edelman | 333—97 |
| 3,222,623 | 12/1965 | Geikler | 333—73 |
| 2,540,012 | 1/1951 | Salati | 333—97 |
| 3,187,280 | 6/1965 | Harrison | 333—97 |
| 3,089,105 | 5/1963 | Alford | 333—73 |

HERMAN KARL SAALBACH, Primary Examiner

C. BARAFF, Assistant Examiner

U.S. Cl. X.R.

333—73, 97; 339—177

UNITED STATES PATENT OFFICE

CERTIFICATE OF CORRECTION

Patent No. 3,492,605    Dated January 27, 1970

Inventor(s) G. W. ZIEGLER, JR.

It is certified that error appears in the above-identified patent and that said Letters Patent are hereby corrected as shown below:

Column 12, line 9, that portion of the formula reading $K^2$  should read  $K_2$ Column 12, line 14, that portion of the formula reading $2B_N'' Y^2$  should read  $2B_N'' Y_2$ Column 12, line 44, that portion of the formula reading $S_3 = S_1 \sqrt{\dfrac{K_1}{K_3}}$  should read  $S_2 = S_1 \sqrt{\dfrac{K_1}{K_2}}$ Column 12, line 70, that portion of the formula reading $[\omega Y^3(C+2C')$  should read  $[\omega Y_3^3(C+2C')]$ Column 13, line 21, that portion of the formula reading $[2B_Q' Y_3^2 - \omega C(B_Q' + G_Q'2)]$  should read $[2B_Q' Y_3^2 - \omega C(B'_Q{}^2 + G'_Q{}^2)]$

UNITED STATES PATENT OFFICE

CERTIFICATE OF CORRECTION (CONTINUED)

Patent No. 3,492,605          Dated Jan. 27, 1970

Inventor(s) G. W. ZIEGLER, JR.

It is certified that error appears in the above-identified patent and that said Letters Patent are hereby corrected as shown below:

Column 13, line 46, that portion of the formula reading $$[(B_{Q\ 2}^{'}+G_Q^{'2}) + Y_3(B_Q^{'2}+G_Q^{'2})]$$ should read
$$[(B_Q^{'2} + G_Q^{'2}) + Y_3(B_Q^{'2} - G_Q^{'2})]$$

SIGNED AND SEALED

JUL 21 1970

(SEAL)
Attest:

Edward M. Fletcher, Jr.
Attesting Officer

WILLIAM E. SCHUYLER, JR.
Commissioner of Patents